Sept. 16, 1941.   H. KUHLMANN   2,255,980

GRAIN HARVESTER

Filed Jan. 2, 1941

Inventor
Heinrich Kuhlmann
by Knight Bros
Attorneys

Patented Sept. 16, 1941

2,255,980

UNITED STATES PATENT OFFICE 2,255,980

GRAIN HARVESTER

Heinrich Kuhlmann, Bad Oeynhausen-Eidinghausen, Germany

Application January 2, 1941, Serial No. 372,743
In Germany December 28, 1939

1 Claim. (Cl. 198—209)

This invention relates to that class of harvesters in which the cut grain falls upon a transversely movable conveyer-apron and is elevated from this to the binder mechanism. It is customary in this kind of harvesters to elevate the grain from the platform conveyer-apron to the binder deck by canvas aprons. These canvas aprons are easily torn or destroyed by mice and rats. Moisture and dampness give an unequal tendency and cause troubles and interruptions.

It is known to elevate the grain by cooperating elevator drums with teeth grasping the grain, but owing to the fact that the drums rotate in the same direction and that the casing inadequately determines the path of the grain, troubles are caused, such as cracking and loss of the grain.

It is an object of the invention to avoid these troubles and to carry the grain positively in an undisturbed path. It is a further object of this invention to elevate the grain without any elevator aprons above the binder-deck. Further objects will be illustrated by describing one form of the invention in detail.

In the accompanying drawing

Figure 1:
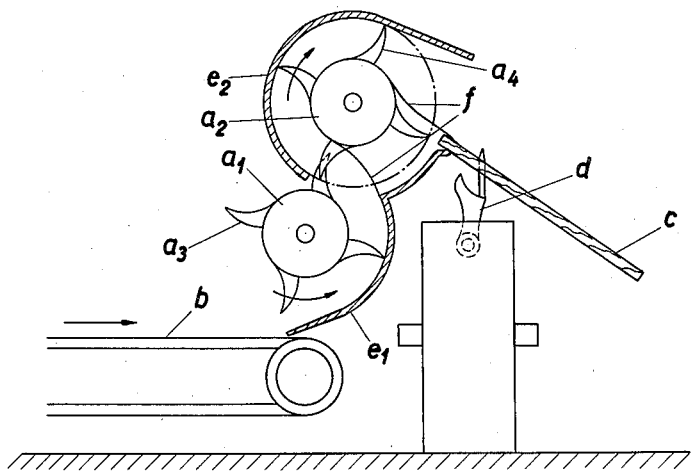
Fig. 1 is a sectional view of the elevating mechanism.

The platform conveyer-apron $b$ passes around rollers as usual and conveys the grain in the direction of the arrow shown in Fig. 1 against the lower conveyer-drum $a_1$. The grasper-teeth $a_3$ of this drum are bent opposite to the direction of the rotating movement and grasp the grain and move it in the path of a casing $e_1$ through about 180°. In this upper position a row of grasping teeth $a_4$ of a second, upper conveyer-drum $a_2$ take the grain up and move it further on in the same direction a second arc of 180°, completing thus the path in the form an S. The second row of grasping teeth is laterally displaced from the path of the first row. A second casing element $e_2$ determines the path of the grain. In order to deliver the grain from the first row to the second row of grasping teeth and from the second row to the binder-deck $c$, stripping means $f$ are arranged. The grain falling upon the binder-deck is conveyed to the binding mechanism by packers $d$ swinging to and fro.

Figure 2:
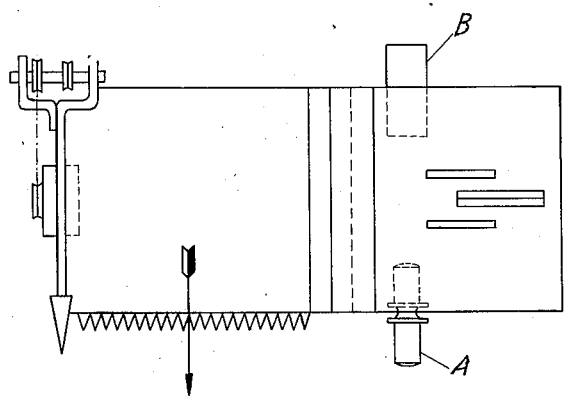
Fig. 2 is a top plan view.

The arrangement of the wheels according to Fig. 2 is as follows:

The harvester is drawn in the direction of the arrow shown in Fig. 2. In this manner the grain comes between the indentations of the cutter. The front wheel A is arranged in a fork to guide the harvester. The main driving wheel which normally is arranged in the midst of the binding table may be dropped without departing from the invention. It is replaced by an additional little back wheel B, from which the cutter, the feeding drums, and through these the binding mechanism and the other mechanism are driven. In this manner a very low construction is secured, preventing loss of grain from the sheaves falling down from the binder-deck.

It is an essential feature of the invention that the casing elements $e_1$ and $e_2$ are arranged close to the ends of the grasping teeth of the elevating drums.

The arrangement according to this invention gives the advantage that the driving motions may be derived from the axles of the elevating drums, whereby a simple construction is secured.

Having now described my invention, what I claim is:

In a harvesting machine having a transversely moving conveyer apron, and an elevated binding deck, means for elevating grain from the conveyer to the binding deck comprising a lower elevator drum at the delivering end of the conveyer apron, an upper elevator drum above the first drum, the two drums rotating in opposite directions, each drum having teeth fixed thereto, the teeth on the two drums intermeshing and a casing so arranged in relation to the drums, close to the ends of their teeth, as to present with said drums, a closed S-shaped path for the grain, the lower portion of the casing open on the side toward the conveyer apron and closed on the opposite side, and the upper portion closed on the side toward the conveyer apron and open on the opposite, delivery, side.

HEINRICH KUHLMANN.